(12) United States Patent
Rovekamp et al.

(10) Patent No.: US 10,293,481 B1
(45) Date of Patent: May 21, 2019

(54) RELATIVE DEFLECTION DETECTOR

(71) Applicant: The United States of America as represented by the Administrator of the National Aeronautics and Space, Washington, DC (US)

(72) Inventors: Roger Rovekamp, Houston, TX (US); Adam H. Parsons, Houston, TX (US); Nicolaus A. Radford, Houston, TX (US); Carolynn J Kanelakos, Houston, TX (US); Peter Neuhaus, Pensacola, FL (US); Joshua S. Mehling, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 226 days.

(21) Appl. No.: 15/378,790

(22) Filed: Dec. 14, 2016

(51) Int. Cl.
*G01L 3/08* (2006.01)
*B25J 9/12* (2006.01)
(Continued)

(52) U.S. Cl.
CPC ............. *B25J 9/104* (2013.01); *B25J 9/12* (2013.01); *B25J 13/088* (2013.01); *F16H 55/14* (2013.01);
(Continued)

(58) Field of Classification Search
CPC . G01L 3/12; G01L 3/101; G01L 3/109; G01L 3/1008; G01L 3/1421;
(Continued)

(56) References Cited

U.S. PATENT DOCUMENTS 3,060,731 A 10/1962 Adise
3,871,215 A * 3/1975 Pratt, Jr. ............. F02D 41/1497
73/862.28
(Continued)

FOREIGN PATENT DOCUMENTS

EP 1134443 A2 9/2001
GB 1569312 A 1/1976
(Continued)

OTHER PUBLICATIONS

Schempf, "Comparative design, modeling, and control analysis of robotic transmissions," No. WHOI-90-43. Woods Hole Oceanographic Institution MA, 1990.
(Continued)

*Primary Examiner* — Jonathan M Dunlap
(74) *Attorney, Agent, or Firm* — Theodore U. Ro; Edward K. Fein; Mark P. Dvorscak

(57) ABSTRACT

In an embodiment, a relative deflection detector may include at least two structural arcs, and a predetermined number of means for measuring position capable of determining the relative deflection in a first component. The at least two structural arcs may be for example, comprised of a first and second structural arc whereby the first and second structural arcs are attached to the first component at respective first and second predetermined locations and whereby each arc is comprised of a respective sequence of indicators, such as, for example, codes inscribed on the outer circumference of each arc. The first and second structural arcs may be positioned in concentric and coplanar relationship with each other. The predetermined number of sensors may be comprised of a first and second optical encoder sensor each positioned in proximate and coplanar relationship with the first and second structural arcs so as to read the first sequence of codes, second sequence of codes, or both, and thereby detect positions of each structural arc (e.g., a first
(Continued)

position corresponding to the first structural arc and a second position corresponding to the second structural arc). The first and second positions may be used to calculate and thereby determine a relative deflection of the first component.

18 Claims, 9 Drawing Sheets

(51) Int. Cl.

| | | |
|---|---|---|
| B25J 9/10 | (2006.01) | |
| B25J 13/08 | (2006.01) | |
| F16H 55/14 | (2006.01) | |
| F16H 55/17 | (2006.01) | |
| G01D 5/347 | (2006.01) | |
| G01L 3/14 | (2006.01) | |
| G01L 3/12 | (2006.01) | |
| G01L 3/10 | (2006.01) | |

(52) U.S. Cl.
CPC ......... *F16H 55/171* (2013.01); *G01D 5/3473* (2013.01); *G01L 3/08* (2013.01); *G01L 3/10* (2013.01); *G01L 3/101* (2013.01); *G01L 3/105* (2013.01); *G01L 3/106* (2013.01); *G01L 3/109* (2013.01); *G01L 3/12* (2013.01); *G01L 3/1407* (2013.01); *G01L 3/1421* (2013.01); *G01L 3/1435* (2013.01); *G01L 3/1442* (2013.01)

(58) Field of Classification Search
CPC ..... G01L 3/1435; G01L 3/1407; G01L 3/105; G01L 3/106; G01L 3/1442; B25J 9/104; B25J 9/12; B25J 13/088; F16H 55/171; F16H 55/14; G01D 5/3473
USPC ................ 324/207.25; 73/862.324, 862.331, 73/862.08, 862.325, 862.321, 862.191, 73/862.326, 117.02
See application file for complete search history.

(56) References Cited

U.S. PATENT DOCUMENTS

| | | | |
|---|---|---|---|
| 4,203,319 A | 5/1980 | Lechler | |
| 4,390,301 A | 6/1983 | Winckelhaus | |
| 4,531,412 A * | 7/1985 | Prud'hon | G10K 11/355 |
| | | | 73/621 |
| 5,197,338 A | 3/1993 | Heiman et al. | |
| 5,450,761 A * | 9/1995 | Zilberman | G01L 3/101 |
| | | | 73/862.041 |
| 5,458,566 A | 10/1995 | Herrig et al. | |
| 5,524,485 A | 6/1996 | Bernard et al. | |
| 5,708,216 A | 1/1998 | Garshelis | |
| 6,260,424 B1 | 7/2001 | Koelblinger | |
| 6,298,736 B1 | 10/2001 | Girard et al. | |
| 6,568,284 B1 * | 5/2003 | Reichl | G01B 7/30 |
| | | | 324/207.2 |
| 6,694,828 B1 * | 2/2004 | Nicot | B62D 1/16 |
| | | | 180/422 |
| 7,559,258 B2 * | 7/2009 | Matzoll | G01L 3/12 |
| | | | 73/862.08 |
| 8,490,210 B2 | 7/2013 | Hahn | |
| 8,707,822 B2 | 4/2014 | Luo | |
| 8,776,619 B2 | 7/2014 | Jammer | |
| 2003/0145663 A1 * | 8/2003 | Heisenberg | B62D 6/10 |
| | | | 73/862.324 |
| 2004/0011149 A1 * | 1/2004 | Carroll | G01B 21/24 |
| | | | 73/866.1 |
| 2004/0255699 A1 * | 12/2004 | Matzoll | G01L 3/12 |
| | | | 73/862.324 |
| 2008/0150519 A1 * | 6/2008 | Hoeller | B62D 6/10 |
| | | | 324/207.2 |
| 2008/0282811 A1 | 11/2008 | Hill | |
| 2011/0152725 A1 | 6/2011 | Demir et al. | |
| 2016/0116353 A1 * | 4/2016 | Hulse | F16F 1/027 |
| | | | 73/862.324 |

FOREIGN PATENT DOCUMENTS

| | | |
|---|---|---|
| JP | H01318933 A | 6/1988 |
| JP | H039116 A | 6/1989 |
| WO | WO2006118946 A1 | 11/2006 |
| WO | WO2014111920 A1 | 7/2014 |
| WO | WO2014154257 A1 | 10/2014 |

OTHER PUBLICATIONS

Hajdu, F., and P. Horvath., "Contactless Torque Sensor Development." Acta Technica Jaurhensis 5.2 (2012), pp. 115-120.

District Kwang-Min et al., "1-axis optical torque sensor developed with an integral structure." Journal of Institute of Control 17.3 (2011): 218-222., p. 218-220.

Tsetserukou et al.,"Optical torque sensors for Implementation of local impedance control at the arm of humanoid robot" Proceedings of the 2006 IEEE Imernational Conference on Robotics and Automation Orlando, Florida—May 2006., pp. 1675-1679.

\* cited by examiner

RELATIVE DEFLECTION DETECTOR

CROSS-REFERENCE TO RELATED APPLICATIONS

Not applicable.

BACKGROUND

Field

Embodiments described herein generally relate to relative deflection detectors, and more particularly, to measuring the relative deflection of a predetermined component.

Description of the Related Art

Many technological applications use accurate knowledge of the position for certain elements of the system. An example is in the field of robotics. The field of robotics relies heavily on accurate knowledge of the position of arms or other appendages. The appendage is moved, or driven, by an actuator (including a motor and a gear train) and is considered the "load" for the actuator. Knowledge of the appendage's position at any given time is important both for safety and operational considerations.

Traditionally, the art considered it best to have what is known as a "stiff" interface between the actuator and the load, and "the stiffer the better". More recently, some in the art have introduced what is known as "elasticity" into the relationship between the load and the actuator. For example, a spring has been used between the actuator and the load to provide "elasticity", which affects the kinetic relationship between the actuator and the load.

One type of "elastic" actuator is known as a Series Elastic Actuator ("SEA"). SEAs have seen increased use in recent years not only in robotics but in other fields such as exoskeletons. SEAs are used to drive a load through an "elastic" interface. In some applications, SEAs drive the load in rotation. SEA design for this context conventionally assumes that the rotation will be through 360°. One need in this context is to be able to ascertain the magnitude and direction of the rotation for positional control through the entire 360° (or more).

At its most basic level, a SEA may have a spring that may be planar, linear or rotary, and that is generally located between a motor and an actuator output. The spring's relative deflection may be measured to obtain an estimate of the force (or torque) applied at the actuator output.

Several approaches have been used to measure spring deflection in a relative deflection detector. The accuracy of this deflection measurement is a difficult problem in the implementation of a SEA. Failure to effectively measure spring deflection can significantly degrade the performance of the SEA.

In order to measure the relative deflection of one or more rotary springs (note that the relative deflection in multiple springs within one actuator may be measured if the concept of series elasticity is so extended), one may measure, for example, the difference in deflection between the inner and outer portions of an individual spring using highly accurate position sensors. A position may be based on, for example, an absolute position, angular position, a linear position, angle of rotation, or any other basis without departing from the basic scope of the invention. The art has developed several techniques to do this task. For example, typical methods use stacked rotary position sensors one on top of another, resulting in increased volume and stack height. In the field of robotics, size and space is valuable and minimizing both is an objective. Devices to measure rotary position may include incremental encoders, absolute position sensors (inductive, capacitive, magnetic, optical), or resolvers.

SUMMARY

A relative deflection detector such as may be used in an actuator (wherein the actuator is comprised of a first component capable of relative deflection within itself) may include, in one particular embodiment, first and second structural arcs, and first and second sensors. It is noted that a relative deflection detector is not limited in its use or operation to an actuator. A variety of devices or sensors may be employed that comprise a means for measuring position such as, for example, optical encoder sensors, optical encoder absolute sensors, incremental encoders, absolute position sensors (inductive, capacitive, magnetic), or resolvers. A position may be based on, for example, an absolute position, angular position, a linear position, angle of rotation, or any other basis without departing from the basic scope of the invention. In an embodiment, the first and second structural arcs are attached to the first component at respective first and second predetermined locations and each has a respective sequence of indicators such as, for example, codes whereby for example, each respective sequence of codes is inscribed on the outer circumference (i.e., the outer planar surface) thereof (i.e., a first and second sequence of codes inscribed on the first and second structural arcs, respectively). In other embodiments, the respective sequence of codes may be inscribed on the outer circumference, inner circumference, upper surface, lower surface, or any combination of the first and second structural arcs. The sequence of indicators may be any signal, sign, object, inscription, code, etc. that may be used to indicate a position. For example, in an embodiment employing capacitive absolute position sensors this sequence of indicators may take the form of patterns of dielectric material providing a unique measurable capacitance associated with each position, while in an embodiment employing magnetic sensors this sequence of indicators may take the form of coded patterns of magnetic material. Embodiments using optical sensors may rely on a variety of indicators as well including inscribed sequences of codes, printed patterns, etched or cut material, etc. In an embodiment, the first and second structural arcs are positioned in concentric and coplanar relationship with each other. In an embodiment, the first and second sensors are positioned in proximate relationship, coplanar relationship, or both with the first and second structural arcs, respectively, so as to read the first and second sequence of codes, respectively, and thereby measure or aid in the measurement of first and second deflections that may be detected in the form of, for example, positions such as angles of rotation. The first and second deflections may be used to calculate a relative deflection of the first component. Other embodiments provide for alternative mounting positions for the sensors (whereby as stated previously, a variety of means for measuring position may be employed), including above the rotation plane of the first component, such that the respective sequence of codes are, for example, inscribed radially on the inner, upper, or lower planar surface of the first and second structural arcs.

Other embodiments may provide a relative deflection detector comprising a split ring and a reader. In an embodiment, the relative deflection detector may be implemented in combination with a SEA that may be comprised of a deflector capable of relative deflection within itself responsive to an applied force. As used herein, a "split ring" is defined as two or more structural arcs positioned in a concentric, coplanar relationship. The split ring of the relative defection detector, in operation, indicates a relative deflection of the deflector. In an embodiment, the split ring may comprise a first structural arc attached to the deflector at a first point and inscribed on a first outer surface (i.e., outer planar surface or outer circumference) thereof with a first plurality of indicators indicating a deflection of the first structural arc and a second structural arc positioned relative to the first structural arc in concentric and coplanar relationship thereto, attached to the deflector at a second point, and inscribed on a second outer surface thereof a second plurality of indicators indicating a deflection of the second structural arc. The reader, in operation, reads the first and second indicators, and includes a first sensor positioned in proximate and coplanar relationship with the first structural arc to read the first indicators and a second sensor positioned in proximate and coplanar relationship with the second structural arc to read the second indicators. As used herein, the term "indicator" means any signal, sign, object, inscription, code, etc. that may be used to indicate a position.

Still other embodiments may provide a SEA Assembly operably connected to a load, wherein the SEA Assembly is comprised of: a motor; a drive (aka a gear train) powered by the motor; a first component capable of relative deflection within itself and operably connected to either the drive or to the motor; an interface either operably connected between the first component and the load or operably connected between the drive and the load; and a relative deflection detector that, in operation, senses one or more relative deflections within the first component during the motor's operation, the drive's operation, or both. In an embodiment, the relative deflection detector comprises a first and second structural arc as well as a first and second means for measuring position such as, for example, a first and second optical encoder sensor.

In an embodiment, the first and second structural arcs are attached to the first component at respective first and second predetermined locations and each has a respective sequence of codes inscribed on the outer circumference thereof. The first and second structural arcs are positioned in concentric and coplanar relationship with each other. The first and second optical encoder sensors are positioned in proximate and coplanar relationship with the first and second structural arcs, respectively, so as to be capable of reading the first and second sequence of codes, respectively, and thereby detect first and second positions. In an embodiment, for example, the first and second positions may be first and second angles of rotation whereby the first and second angles of rotation may be used to calculate a relative deflection of the first component.

In some embodiments, the first component or deflector is a rotary spring. In another embodiment, the first component is a planar rotary spring whereby the word "planar" as used in this context means substantially two-dimensional. In another embodiment, the first component is a planar torsion spring. Still other suitable types of springs may become apparent to those having the benefit of this disclosure.

Some embodiments may further comprise a third structural arc and a third means for measuring position, such as for example, a third optical encoder sensor. In an embodiment, the third structural arc has a third sequence of codes inscribed on a third outer circumference thereof and is attached to the first component at a third predetermined location. The third optical encoder sensor is positioned in proximate and coplanar relationship with the third structural arc and is capable of detecting or measuring a third position such as, for example, a third angle of rotation or angular position of the third structural arc by reading the third sequence of codes. The first, second, and third angles of rotation or angular positions may be used for redundant measurement of a single relative deflection or to calculate the relative deflection of two components (as would be desired, for example, in a SEA that incorporates multiple unique deflectors or rotary springs). This embodiment may be extended to any number of "n" structural arcs and "n" means for measuring position as, for example, space, the desired degree of rotational motion, and the desired relative deflections to measure permit. Stated otherwise, in an embodiment, a relative deflection detector may be comprised of at least two structural arcs and a second predetermined number of sensors. The number of structural arcs (which would be equal to two or more) could be identified as a first predetermined number. And therefore, the number of sensors could be identified as the second predetermined number wherein the second predetermined number would be equal to the first predetermined number.

Some embodiments may further comprise a third means for measuring position, such as for example, a third optical encoder sensor positioned in proximate and coplanar relationship with the first structural arc and the second structural arc. The third optical encoder sensor may be capable of detecting the first position such as, for example, an angle of rotation or angular position of the first structural arc by reading the first sequence of codes; or detecting the second position such as, for example, an angle of rotation or angular position of the second structural arc by reading the second sequence of codes; or both the first and second deflections by reading the first and second sequences of codes, depending on both the overall rotation of the structural arcs and the relative deflection between the structural arcs. This embodiment allows for continuous rotation of the first component and the attached first and second structural arcs while preserving the ability to measure relative deflection at any point around a 360° range of motion. Some embodiments may further comprise a third structural arc and a fourth means for measuring position, such as for example, a fourth optical encoder sensor (or any number of "n" structural arcs and "n+1" means for measuring position), extending the previously described embodiment to allow redundant deflection measurements or deflection measurements of multiple deflectors over a continuous rotation. Stated otherwise, in an embodiment, a relative deflection detector may be comprised of at least two structural arcs and a second predetermined number of sensors. The number of structural arcs (which would be equal to two or more) could be identified as a first predetermined number. And therefore, the number of sensors could be identified as the second predetermined number wherein the second predetermined number would be equal to the first predetermined number plus one.

DETAILED DESCRIPTION

The relative deflection sensing technique disclosed herein provides a relative deflection detector in which means for measuring position such as sensors are not stacked with respect to each other, but are rather placed in a proximate and coplanar relationship with one another. In an embodiment, this relationship is permitted by the use in the relative deflection detector of a "split-ring" in the form of two structural arcs, each attached to a component capable of relative deflection within itself at a respective point. In an embodiment, the two structural arcs are each inscribed with a predetermined sequence of codes on their outer circumference that are then read by the optical encoder sensors as the structural arcs rotate with the deflecting component. In other embodiments, the respective sequence of codes may be inscribed on the outer circumference, inner circumference, upper surface, lower surface, or any combination of the first and second structural arcs. Still other embodiments may adopt a variety of indicators appropriate for the method of position measurement employed. For example, an embodiment employing capacitive absolute position sensors may use a sequence of indicators comprised of patterns of dielectric material that provide a unique measurable capacitance associated with each position, while an embodiment employing magnetic sensors may use a coded pattern of magnetic material. Embodiments using optical sensors may rely on a variety of indicators as well including inscribed sequences of codes, printed patterns, etched or cut material, etc.

Figure 1:
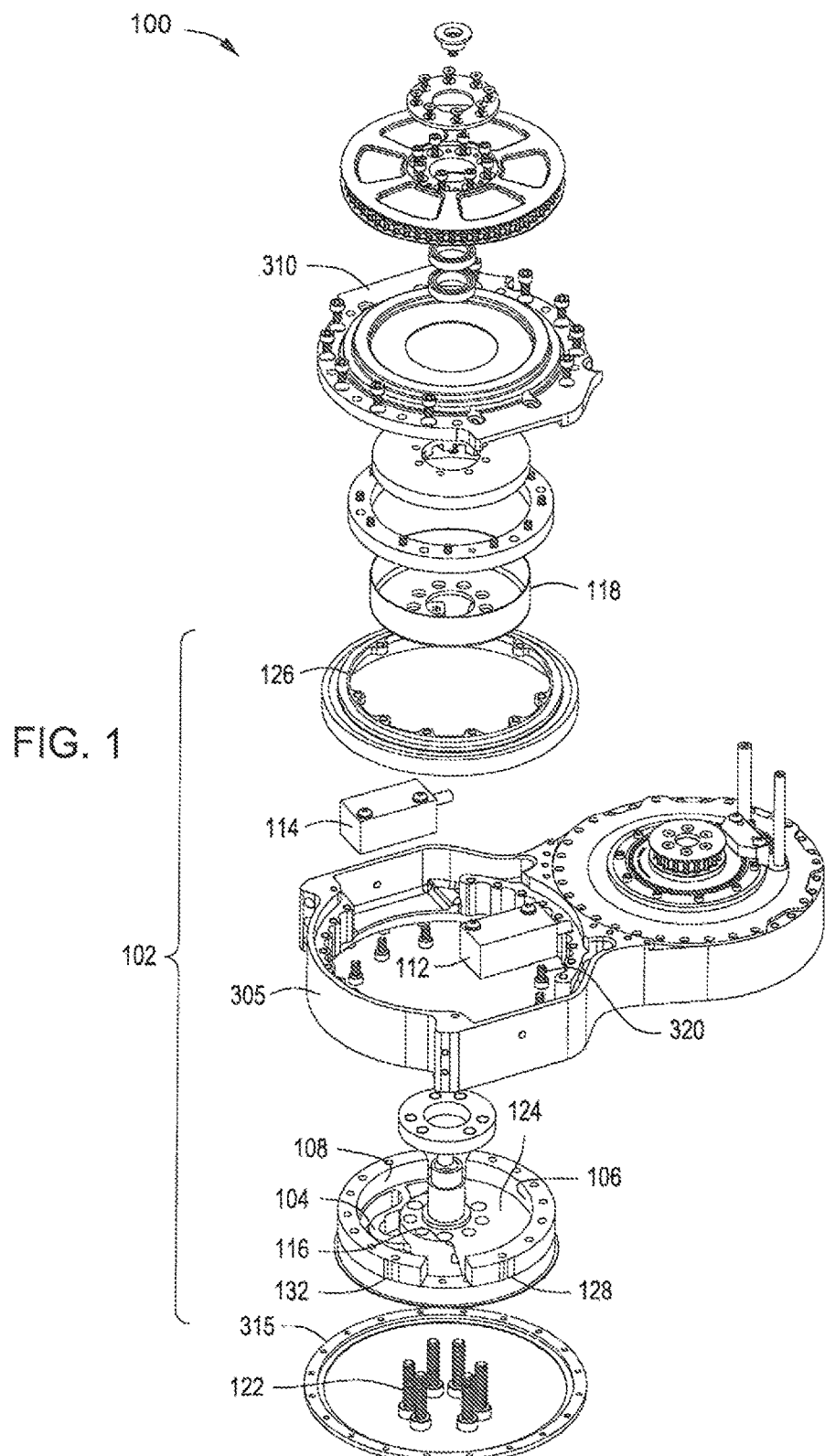
FIG. 1 is a partially exploded view of a SEA Assembly including, in particular, one particular embodiment of a relative deflection detector constructed and operated in accordance with the invention disclosed herein.

Turning now to the drawings, FIG. 1 is a partially exploded view of an embodiment of a SEA Assembly 100 including one particular embodiment of a relative deflection detector 102 constructed and operated in accordance with the invention disclosed herein. The relative deflection detector 102 can include first and second structural arcs 106, 108; and first and second optical encoder sensors 112, 114.

In an embodiment, the SEA Assembly 100 may comprise a first component (also referred herein as a deflector) 104, more particularly, wherein said first component 104 is capable of relative deflection within itself. In the illustrated embodiment in FIG. 1, the first component 104 is a torsion spring and is planar and rotary in design. However, other kinds of structural elements may be used in alternative embodiments. For example, some alternative embodiments may instead employ a suitably flexible post or pin, a cantilevered beam structure, or a wire wound torsion spring. Still other suitable types of structures may become apparent to those having the benefit of this disclosure. In an embodiment, the relative deflection is used in this particular embodiment to measure a torque in a manner described more fully below.

In an embodiment, the first and second structural arcs 106, 108 are attached to the first component 104 at respective first and second points 116, 118. The manner of attachment may vary by implementation. In the illustrated embodiment in FIGS. 1 and 2, the first structural arc 106 is manufactured as part of the same component as the first component 104 (i.e. the components are machined as a single part). In another embodiment (not illustrated), the first structural arc may be attached to the first component by, for example, fastening and/or pinning. The second structural arc 108 is both pinned and fastened at multiple second points 118, with neither the pins nor the fasteners being shown. The actual points of attachment in any given embodiment may vary so long as the resultant relationship permits operation as described herein.

Figure 2:
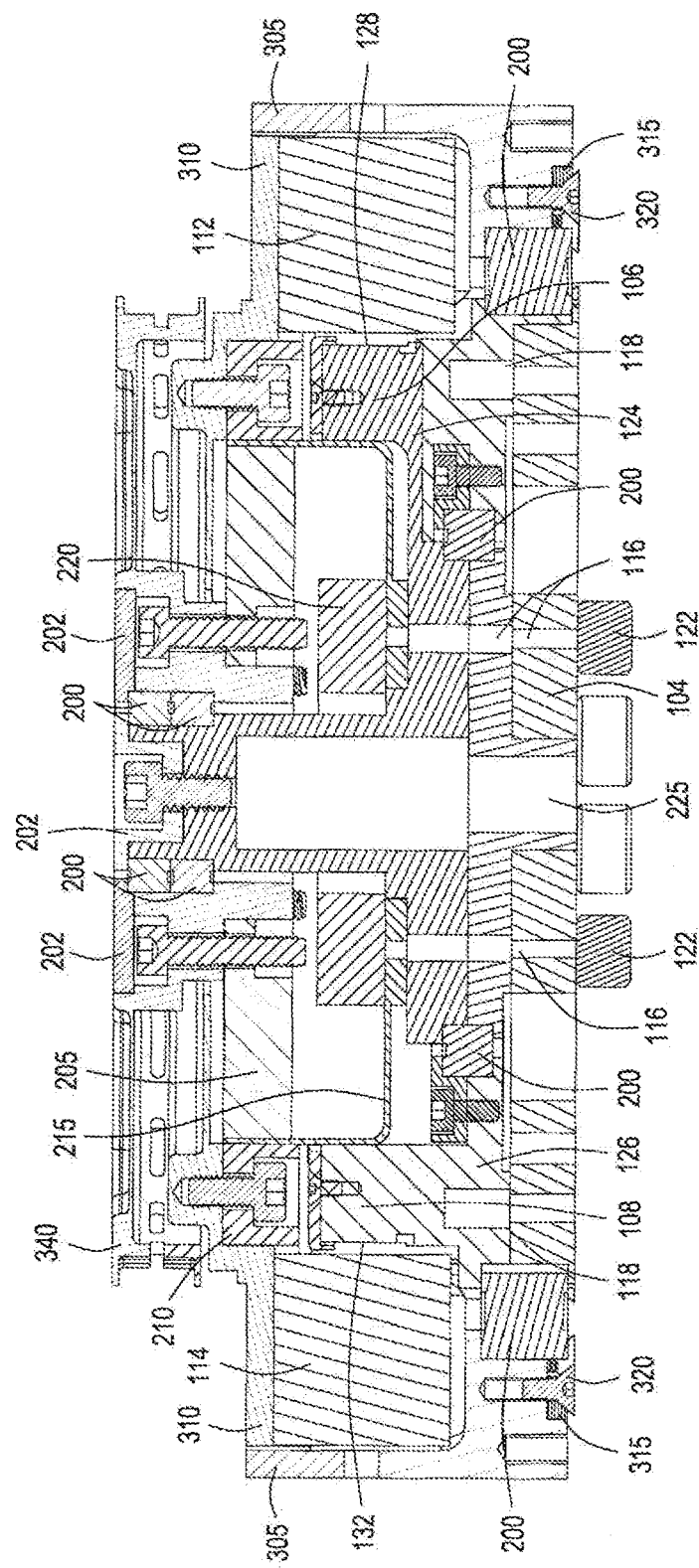
FIG. 2 is a sectional view along lines 2-2 shown in FIG. 3.

With continued reference to FIG. 2, the first and second structural arcs 106, 108 are positioned in concentric and coplanar relationship with each other. When assembled, the first and second structural arcs 106, 108 form a "split ring", as they are in a concentric, coplanar relationship. As used herein, a "split ring" is defined as two or more structural arcs positioned in a concentric, coplanar relationship. However, as is apparent from the drawings, the first and second structural arcs 106, 108 are portions of larger structures that help define this relationship. Turning our attention to FIGS. 1 and 2, those larger structures are a first split ring outer mounting component 124 and a second split ring outer mounting component 126. Note that not all portions of those larger structures are in concentric or coplanar relationship with one another. Nevertheless, the first and second structural arcs 106, 108 themselves are.

As may be seen in FIG. 1, the first and second structural arcs 106, 108 are also each inscribed with first and second sets of indicators, or sequences 128, 132, respectively, of codes. In operation, the codes will indicate a degree of deflection (e.g., an angle of rotation in this embodiment) from which one can measure that deflection as described below. The "code" may be relatively simple or relatively complex depending on the embodiment. Other embodiments, for example, may employ other means for measuring position including incremental encoders, absolute position sensors (optical, inductive, capacitive, magnetic), or resolvers, each which may utilize different types of codes to measure position. A position may be based on, for example, an absolute position, angular position, a linear position, or angle of rotation. Still other embodiments may have variations of the accuracy or resolution required from the measured angle or deflection, depending on the application. The codes of the first and second sets 128, 132 may also be the same or different in various embodiments.

In an embodiment, the first and second optical encoder sensors 112, 114 are positioned to read the first and second sequences 128, 132 of codes when in operation. They are thereby capable of detecting first and second deflections of the first and second structural arcs 106, 108 by reading the first and second sequences 128, 132, respectively, of codes. In the illustrated embodiment, the first and second optical encoder sensors 112, 114 are commercial off-the-shelf implementations. Many suitable means for measuring position or sensors are known to the art and any such means for measuring position or sensor may be used. Power and data may be run to and from the first and second optical encoder sensors 112, 114 using leads (not shown) that may, if desired, be constrained by wiring harnesses or conduit (neither of which are shown).

The concentric, coplanar relationship between the first and second structural arcs 106, 108 and the first and second optical encoder sensors 112, 114 may be better seen in FIG. 2. This drawing is sectioned along line 2-2 in FIG. 3. In an embodiment, FIG. 2 also shows additional structure associated with the implementation of the relative deflection detector 102 as a torque sensor in the SEA Assembly 100. For example, there are several sets of bearings 200 and bearing capture plates 202 that facilitate the rotation of several pieces. The drive is a harmonic drive and so includes a harmonic drive wave generator 205, a harmonic drive circular spline 210, a harmonic drive flex cup 215, and a harmonic drive flex cup capture ring 220. The SEA Assembly 100 houses the gear train while providing primary structure for the actuator as well as a connection point to an external load (not shown).

Figure 3:
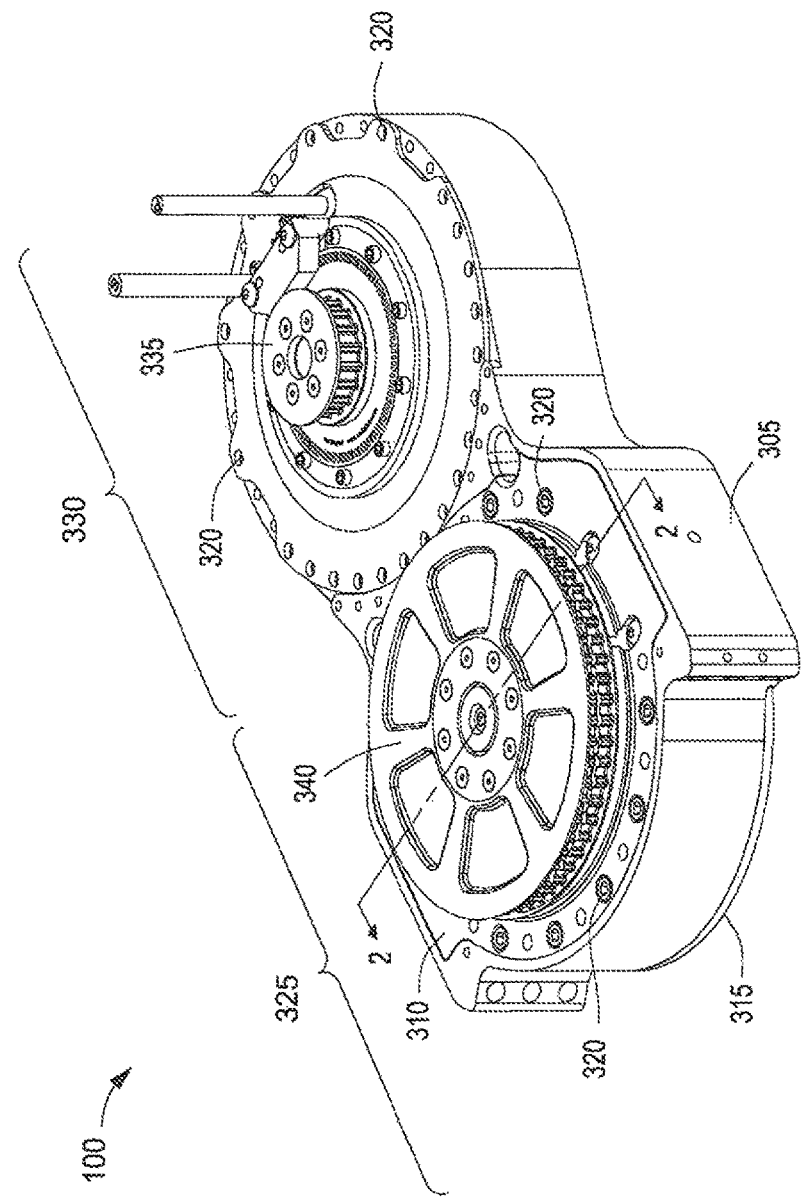
FIG. 3 is an assembled, top, elevational view of the SEA Assembly of FIG. 1-FIG. 2.

FIG. 3 is an assembled, top, elevational view of the SEA Assembly 100 first shown in FIG. 1-FIG. 2. The SEA Assembly 100 includes a housing 305, a top cover 310, and a bottom cover 315. The top and bottom covers 310, 315 are affixed to the housing 305 in any suitable manner known to the art. In the illustrated embodiment, the top and bottom covers 310, 315 are affixed to the housing 305 by a plurality of fasteners 320, not all of which are indicated. The fasteners 320 are, more particularly, screws that are screwed into aligned holes (not shown) in the housing 305.

Figure 4A:
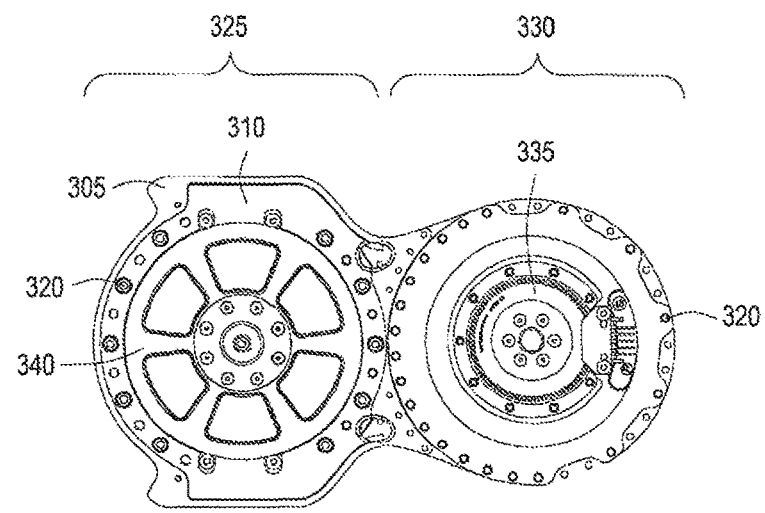
FIG. 4A depicts the SEA Assembly of FIG. 3 in a top view.
Figure 4B:
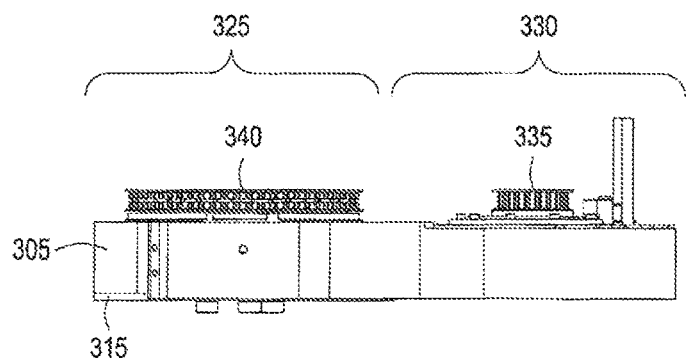
FIG. 4B depicts the SEA Assembly of FIG. 3 in a side view.
Figure 4C:
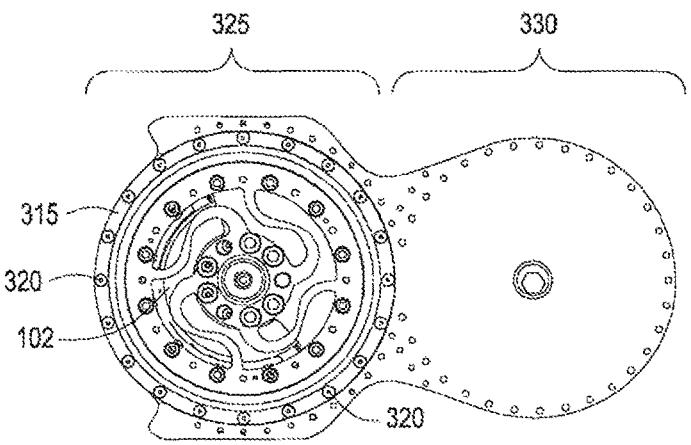
FIG. 4C depicts the SEA Assembly in FIG. 3 in a bottom view.

The top portion 325 of the SEA Assembly 100 houses the relative deflection detector 102 of FIG. 1-FIG. 2 as best seen in FIG. 2. In this particular embodiment, the bottom portion 330 houses a brushless DC motor; rotational motion is translated to the top portion 325 of the SEA Assembly 100 via a belt (not shown) that is run between the belt drive mount 335 of bottom portion 330 and a belt drive mount 340 of top portion 325, shown in FIG. 3. The motor and belt drive is of conventional design and is conventionally applied. Therefore, to avoid obscuring the invention, further discussion of the motor and belt drive shall be omitted. Many of these features can also be seen in FIG. 4A-FIG. 4C. Many suitable means of providing rotational motion to the components of the SEA Assembly 100 are known to the art and any such means may be used.

Figure 5A:
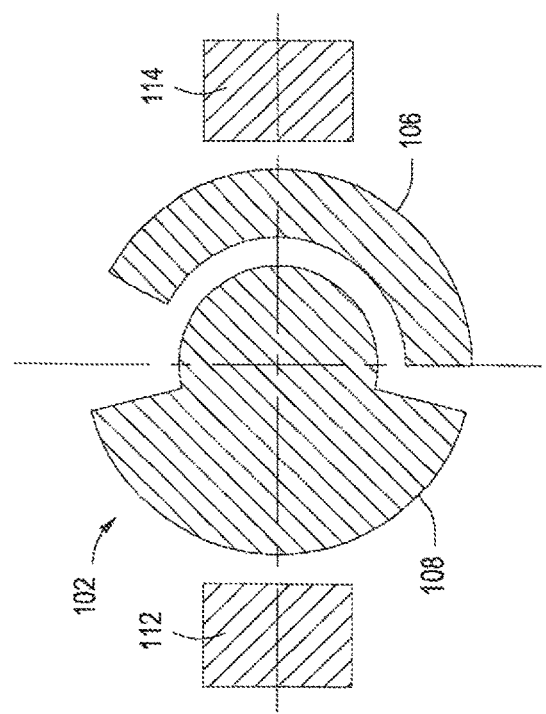
FIG. 5A, in conjunction with FIG. 5B, depicts the operation of the relative deflection detector of FIG. 2-FIG. 3.
Figure 5B:
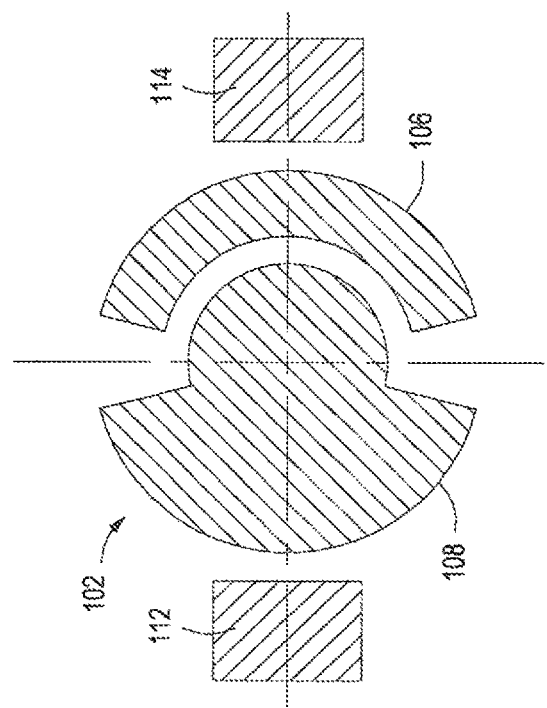
FIG. 5B, in conjunction with FIG. 5A, depicts the operation of the relative deflection detector of FIG. 3-FIG. 2.

FIG. 5A-FIG. 5B conceptually illustrate the operation of the relative deflection detector 102. As shown in FIG. 5A, the first and second structural arcs 106, 108 are in a first relative position when no load is applied. The first and second structural arcs 106, 108 are equally spaced and their relative deflection is zero. As shown in FIG. 5B, when a load is applied, the first and second structural arcs 106, 108 move to a second relative position proportional to the applied load. The difference between the first and second relative positions is a relative deflection proportional to the applied load and from which the applied torque may be determined.

The first and second optical encoder sensors 112, 114 read the first and second sequences 128, 132 of codes as described above. They may read them continuously or periodically in "snapshot" fashion depending on the embodiment. Either way, they read the first and second sequences 128, 132 of codes, respectively, at both the first and second relative positions and, together, define a reader for the codes in this embodiment. Other embodiments may use a different combination of sensors (optical, capacitive, inductive, magnetic) to effectively read all required codes. The codes are then transmitted to a processor 631 which can then determine the relative deflection from the sensed codes in a conventional manner.

Thus, this particular embodiment employs a "split ring" in the form of the first and second structural arcs 106, 108. This is contrary to conventional practice in which a single, continuous ring is used in contemplation of a 360° range of motion. Conventional designs therefore read a single, continuous ring. This, in turn, yields a design in which the optical encoder sensors are stacked, thereby increasing the profile of a SEA Assembly.

Because the illustrated embodiment splits the ring into the first and second structural arcs 106, 108 positioned in a co-planar relationship, in an embodiment, the first and second optical encoder sensors 112, 114 may also be placed in a co-planar relationship. Thus, by controverting the conventional wisdom in the art, the illustrated embodiment is able to provide a slimmer profile. This is advantageous in many applications where size is an important constraint. However, this particular embodiment does not sense a continuous 360° of rotation due to the gap between the first and second structural arcs 106, 108 and the embodiment's reliance on only two optical encoder sensors. Because this particular embodiment is intended for applications requiring a limited range of rotational motion, the range of motion in this particular embodiment is limited to about 180°. This may not be a liability in some applications and so generally constitutes an acceptable design tradeoff. Other embodiments to be described in more detail infra also employ a "split ring" but do so in a relative deflection detector configuration that does allow for continuous 360° rotation and measurement.

There may be many variations on the embodiment described above that are all within the scope of the claimed subject matter. For example, those in the art having the benefit of this disclosure will appreciate that the sensing and determination of the relative deflection will typically occur many times rather than twice in most implementations. For another example, there may be variation in the number of means for measuring position such as for example, optical encoder sensors and/or structural arcs. Specifically, a relative deflection detector may comprise any combination of two or more means for measuring position such as for example, encoder sensors and two or more structural arcs wherein in an embodiment, each structural arc is inscribed with a predetermined sequence of indicators. Still other variations may become apparent to those skilled in the art having the benefit of this disclosure.

In another example, FIG. 6A-FIG. 6D conceptually illustrate in a top view the operation of one such alternative embodiment in which a first, second, and third optical encoder sensor 600-602, read a first and second structural arc 605, 606, respectively. Each optical encoder sensor 600-602 can read a predetermined sequence of codes inscribed on each of the first and second structural arcs 605, 606 (note that the predetermined sequences of codes are not shown in FIGS. 6A-6D, however, the concept of these predetermined sequences of codes is illustrated in FIG. 1). In this particular embodiment, each optical encoder is not tied to a specific structural arc 605, 606 due to the range of motion of the actuator. As the output of the actuator rotates, the structural arcs rotate relative to the optical encoder sensors and over the course of 360° or more of rotation, each optical encoder sensor 600-602 may be reading sequences of codes from either structural arc 605, 606 at any given time. Due to the range of motion of the actuator and because the first and second structural arcs 605, 606 are coplanar, each of the optical encoder sensors 600-602 will read both of the structural arcs 605, 606 over time.

Figure 6A:
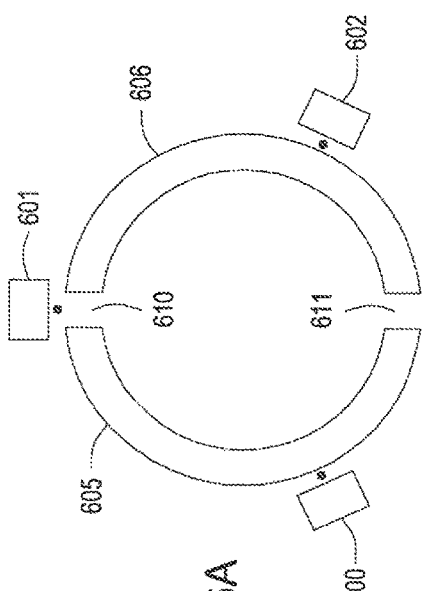
FIG. 6A, in conjunction with FIG. 6B-FIG. 6D, depicts the operation of an embodiment of a relative deflection detector alternative to that shown in FIG. 1-FIG. 2.
Figure 9:
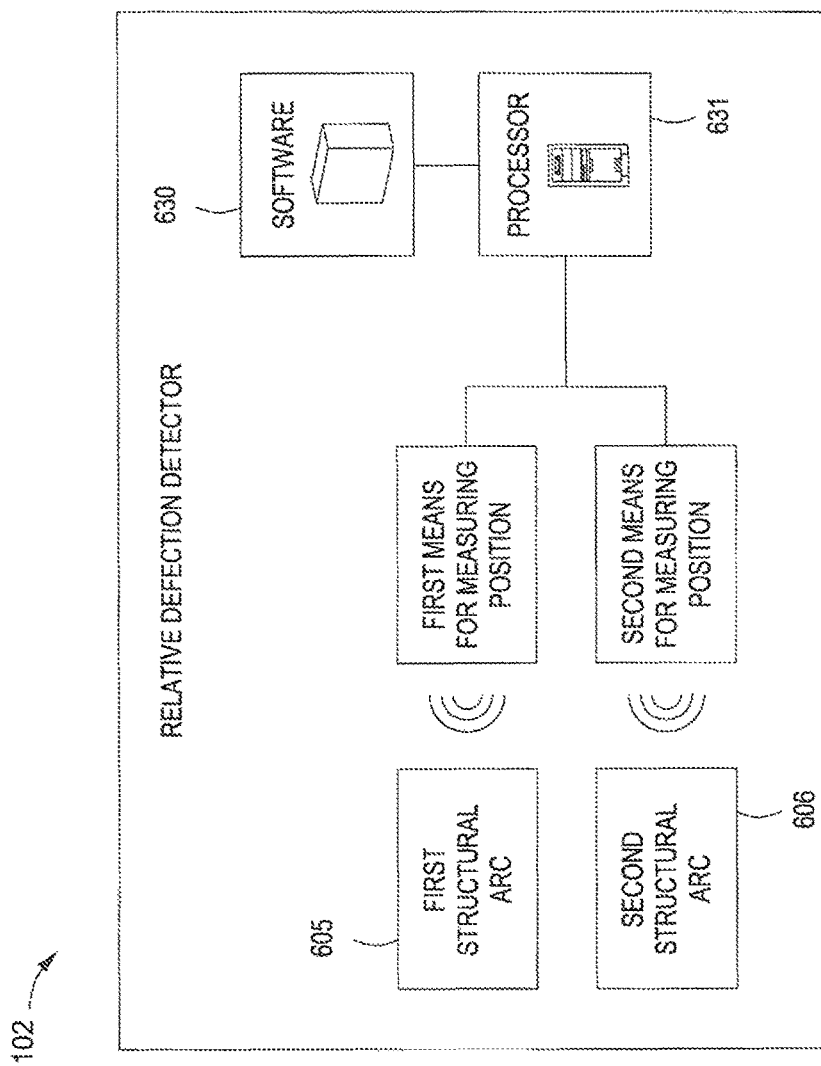
FIG. 9 conceptually illustrates an embodiment of a relative deflection detector comprised of two structural arcs, two means for measuring position, a processor, and software.

The third optical encoder sensor 602 in this embodiment, as compared to the two optical encoder sensors in the previously described embodiment, provides redundant information at any point, except in the case where it is reading a gap between the first and second structural arcs 605, 606, such as for example a first gap 610 shown in FIG. 6A, at which time it is providing no information. With particular reference to FIG. 9, in an embodiment, software 630 processes all the incoming data from various means for measuring position (such as, e.g., optical encoder sensors) to determine which means for measuring position are providing the correct position, and which one (at any given instant in time) is providing either redundant information or no information. Note that the sequences of codes inscribed on the first and second structural arcs 605, 606 may be structured so that the software 630 can discriminate between them and thus know from which structural arc specific data are being read. For example, in one such embodiment, absolute position sensor codes may be used such that the combination of the first structural arc 605 and second structural arc 606 provides slightly less than 360° of angular position data, with each structural arc having a unique set of codes corresponding to a unique portion of the 360° range. In this example, each optical encoder sensor 600-602 may be used to determine the angular position of each structural arc 605-606 as it passes through the sensing range of a particular optical encoder sensor and the specific angular position measurement recorded by each optical encoder sensor may be used in software 630 to determine from which specific structural arc (and corresponding unique set of codes) the measurement was made.

Figure 6B:
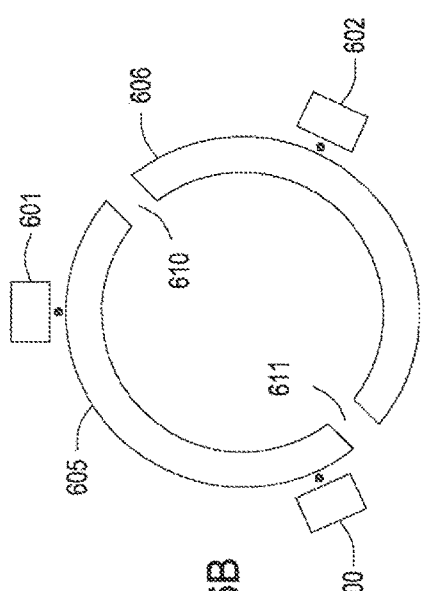
FIG. 6B, in conjunction with FIG. 6A and FIG. 6C-FIG. 6D, depicts the operation of an embodiment of a relative deflection detector alternative to that shown in FIG. 1-FIG. 2.

Returning to the drawings, FIG. 6A depicts an undeflected or first position (aka an initial point). The actuator rotates clockwise in this particular embodiment. At the first position or initial point, first optical encoder sensor 600 is providing the position for first structural arc 605, second optical encoder sensor 601 is on the first gap 610 between the first and second structural arcs 605, 606 so is providing no position measurement, and third optical encoder sensor 602 is providing position for second structural arc 606. As shown in FIG. 6B, as the actuator rotates clockwise the first structural arc 605 moves into the second encoder sensor's 601 sensing range and the first gap 610 moves out of the second encoder's 601 sensing range. In this configuration, the first and second optical encoder sensors 600, 601 are both providing position data for first structural arc 605, and the third optical encoder sensor 602 is providing position data for the second structural arc 606.

Figure 6C:
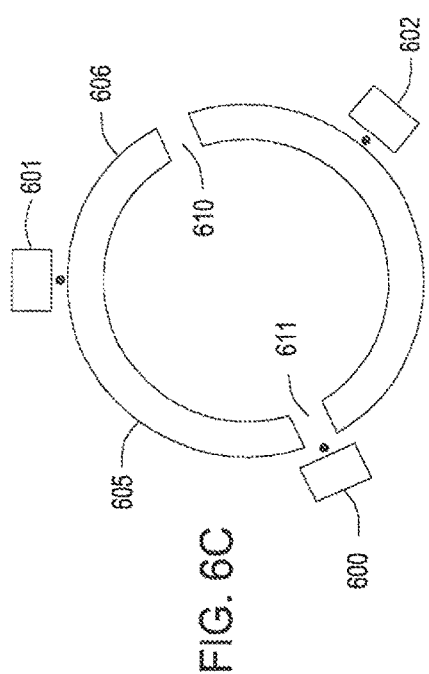
FIG. 6C, in conjunction with FIG. 6A-FIG. 6B and FIG. 6D, depicts the operation of an embodiment of a relative deflection detector alternative to that shown in FIG. 1-FIG. 2.
Figure 6D:
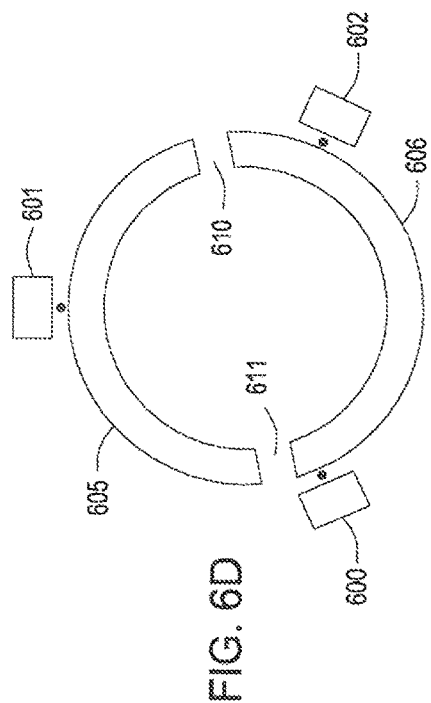
FIG. 6D, in conjunction with FIG. 6A-FIG. 6C, depicts the operation of an embodiment of a relative deflection detector alternative to that shown in FIG. 3-FIG. 2.

Turning now to FIG. 6C, as the actuator continues to rotate clockwise, the first optical encoder sensor 600 no longer provides position data for either the first or second structural arc 605, 606. Specifically, the first optical encoder sensor 600 is on the second gap 611 between the first and second structural arcs 605, 606 and is providing no position data. The second optical encoder sensor 601 reads the first structural arc 605 (specifically, the predetermined sequence of codes inscribed on the first structural arc 605) and the third optical encoder sensor 602 reads the second structural arc 606. FIG. 6D shows that if the actuator continues to rotate clockwise, position data for first structural arc 605 will be provided by the second optical encoder sensor 601, while position data for the second structural arc 606 is redundantly provided by both first and third optical encoder sensor 600 and 602. The pattern continues as the actuator rotates all the way around, passing through its first position (aka initial point), and continues rotating beyond 360°. Note that in FIG. 6B both the first and second optical encoder sensors 600, 601 are reading the first structural arc 605 and the third optical encoder sensor 602 is reading the second structural arc 606. Similarly, in FIG. 6D, the first and third optical encoder sensors 600, 602 are reading the second structural arc 606 and the second optical encoder sensor 601 is reading the first structural arc 605.

In a particular embodiment wherein a deflector or first component 104 is comprised of a spring, the spring deflects from 0° within a range between approximately positive and negative 4°. The first and second structural arcs 605, 606 consequently are basically rotating together, but may differ from each other by a few degrees (e.g., within the approximately +4° to −4° range) when the spring deflects. Measuring this deflection between structural arcs is how the spring's relative deflection itself is measured/calculated. The range of angular difference between the first and second structural arcs 605, 606, is determined by the rotational deflection range of the spring or deflector, in this embodiment the range of deflection is determined by a number of factors including the stiffness of the spring, the elastic deformation limits of the spring material, and the overall desired torque capacity of the actuator in which the relative deflection detector is to be used. The above description differs from the previous embodiment illustrated in FIGS. 6A-6D in which the rotational range of motion is intentionally limited such that optical encoder sensor only reads data from a specific structural arc.

Figure 6E:
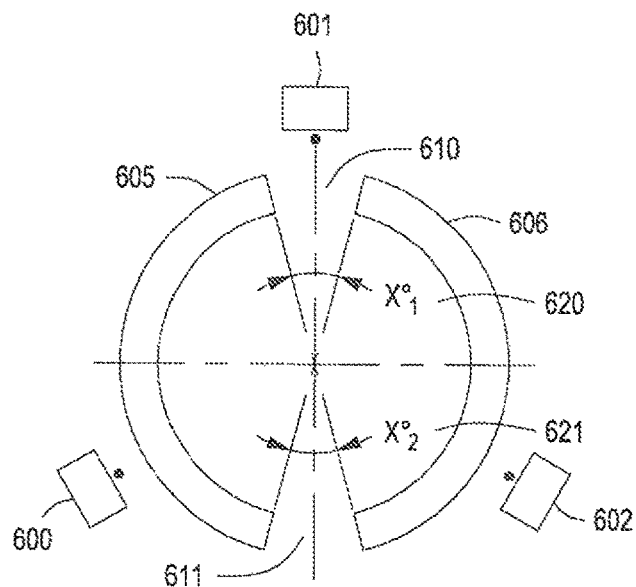
FIG. 6E, in conjunction with FIG. 6F, depicts the operation of an embodiment of a relative deflection detector alternative to that shown in FIG. 1-FIG. 2.
Figure 6F:
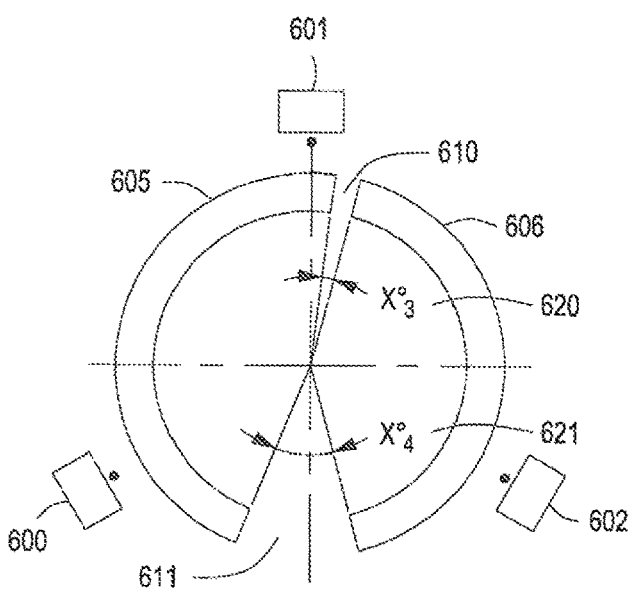
FIG. 6F, in conjunction with FIG. 6E, depicts the operation of an embodiment of a relative deflection detector alternative to that shown in FIG. 1-FIG. 2.

FIGS. 6E-6F illustrate the relative deflection between the first and second structural arcs 605, 606. FIG. 6E depicts an undeflected, first position. In this first position, the first and second structural arcs 605, 606 form a first and second gap 610, 611. Further, the first and second gap 610, 611 define and relate to a first and second angle of rotation 620, 621. In this first position, the first and second angle of rotation 620, 621 have an initial value of $x_1°$ and $x_2°$, respectively. As illustrated in FIG. 6F, it may be assumed that the first structural arc 605 rotates, while the second structural arc 606 remains stationary. In both FIGS. 6E-6F it may be assumed that the first optical encoder sensor 600 is reading the first structural arc 605 and the third optical encoder sensor 602 is reading the second structural arc 606. The second optical encoder sensor 601 is depicted in FIG. 6E on the first gap 610 and in FIG. 6F as reading the second structural arc 605. When the first structural arc 605 deflects relative to the second structural arc 606, the gaps between each of the arcs, 610 and 611, vary related to the angles of rotation 620, 621.

While the physical gaps between the first and second structural arcs 605, 606 are not directly measured, a first and second angles of rotation 620, 621 based on the position of the first and second structural arcs 605, 606 at each optical encoder sensor 600-602 are directly measured. As illustrated in FIG. 6F, first and second angles of rotation 620, 621 change in value as compared to the first position illustrated in FIG. 6E from $x_1°$ and $x_2°$ to $x_3°$ and $x_4°$, respectively. As previously described, in an embodiment, a relative deflection is calculated based on the difference or change in the angular positions of two structural arcs. While the example illustrated in FIGS. 6E-6F assumes the second structural arc 606 is stationary for illustrative purposes, it is important to note that in the full embodiment with two structural arcs 605 and 606 and three optical encoder sensors 600-602, both structural arcs 605, 606 are able to rotate over 360° (as illustrated in FIGS. 6A-6D) and rotate relative to each other (as illustrated in FIGS. 6E-6F) and move in any combination of these motions.

In FIGS. 6A-6D, the utilization of three optical sensors 600-602 and two structural arcs 605, 606 also facilitates a slimmer profile by employing a split ring in which the first and second structural arcs 605, 606 are positioned in a co-planar relationship as are the first, second, and third optical encoder sensors 600-602. Note that in addition to the co-planar relationship, the first and second structural arcs 605, 606 are also in a concentric relationship with respect to each other. The use of a third optical encoder sensor 602 furthermore permits the sensing of a full 360° (or more) range of motion. This is possible as long as the position of each structural arc 600-602 is read by at least one optical encoder sensor at all times. Incorporating a third sensor (wherein no two adjacent sensors are separated by an angle equal to or greater than the angle separating the two gaps 610 and 611) ensures that only one sensor at a time will be on a gap and both structural arcs 605, 606 will be measured at all times. For example, in FIG. 6E, the angle separating the two gaps 610, 611 is effectively 180° whereby each angle separating two adjacent sensors is effectively 120°. Because each angle separating two adjacent sensors is less than the angle separating the two gaps, 610 and 611, this configuration ensures that only one sensor at a time will be on a gap and both structural arcs 605, 606 will be measured at all times. Furthermore, the codes inscribed on the first and second structural arcs 605, 606 may be encoded to permit discrimination as to which structural arc a given code is being read from. For example, a predetermined first sequence of codes inscribed on the first structural arc 605 may be unique and different as compared to a predetermined second sequence of codes inscribed on the second structural arc 606. This overall concept of utilizing unique and different codes (e.g., a unique pattern, unique characters, etc.) can also be applied whereby more than two structural arcs are employed. In another embodiment, combinations of the same sequence of codes as well as unique sequence of codes may also be utilized whereby more than two structural arcs are employed. The use of a third optical encoder sensor results in a relative deflection detector that senses the same range as conventionally designed relative deflection detectors while providing a slimmer profile, all while contravening the conventional wisdom regarding design of relative deflection detectors.

Figure 7:
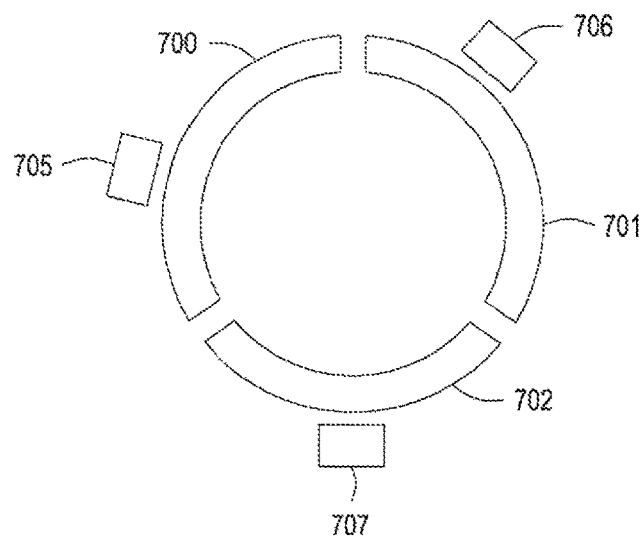
FIG. 7 conceptually illustrates yet another alternative embodiment employing three sensors to read three structural arcs.
Figure 8:
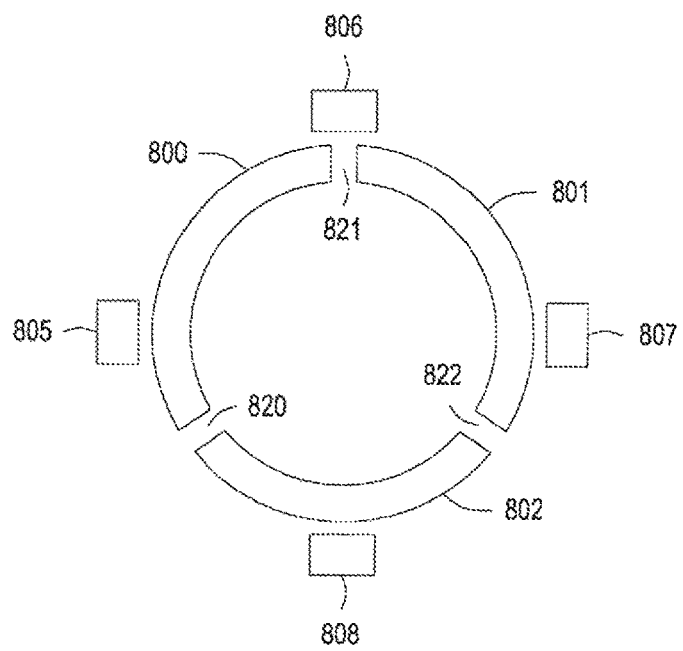
FIG. 8 conceptually illustrates still yet another alternative embodiment employing four sensors to read three structural arcs.

The techniques taught herein may be further extended to more than two structural arcs with more than two sensors as illustrated in FIG. 7 and FIG. 8. In FIG. 7, three structural arcs 700-702 are read by three optical encoder sensors 705-707. In an embodiment, each optical encoder sensor 705-707 is limited to only read a specific one of the structural arcs 700-702, and in another embodiment, the rotational range of motion is limited to a predetermined amount such as for example, to about 120° total. This further modification to the technique of the embodiment illustrated in FIGS. 5A-5B allows multiple relative deflections to be measured (e.g. for redundancy or to measure the deflections of multiple deflectors) as all three structural arcs can deflect relative to the others and the individual angular position measurements from each of the optical encoder sensors may be used, as similarly described before, to determine each relative deflection. In the particular embodiment illustrated in FIG. 7 the relative deflection sensor is not able to read relative deflections at every point around a 360° rotation because at some positions a sensor will be on a gap and one of the structural arcs will not be measured. This may not be a liability in some contexts and so generally constitutes an acceptable design tradeoff. In general this embodiment may be extended to any number of "n" structural arcs and "n" means for measuring position to measure an arbitrary number of relative deflections.

Yet another embodiment, illustrated in FIG. 8, consists of three structural arcs 800-802 and four optical encoder sensors 805-808. Adding a fourth optical encoder sensor 808, further extending the technique illustrated in FIGS. 6A-6F, permits the measurement of multiple deflections (as in the previous embodiment illustrated in FIG. 7) while also allowing sensing around a full 360° (or more) range of motion. This measurement is possible as long as the position of each structural arc is read by at least one optical encoder sensor at all times. Incorporating a fourth sensor (wherein no two adjacent sensors are separated by an angle equal to or greater than the angle separating any two gaps 820-822) ensures that only one sensor at a time will be on a gap and all three structural arcs 800-802 will be measured at all times. In general this embodiment may be extended to any number of "n" structural arcs and "n+1" means for measuring position such as for example, optical encoder sensors to measure an arbitrary number of relative deflections around a continuous 360° (or more) rotation.

In each illustration of the embodiments described herein it is shown that all structural arcs are of equal arc length and all optical encoder sensors are positioned equally spaced around the circumference of the structural arcs. While these choices may represent an optimal configuration, maximizing range of travel for example, in some circumstances, these configurations are not strictly necessary. Multiple configurations adopting structural arcs of varying lengths or optical encoder sensors with varied physical spacing exist and may be considered if suitable for the given application. Still further variations of the techniques described herein may be realized in still other alternative embodiments. In an embodiment, for example, wherein there is a configuration comprised of more than one structural arc, the structural arcs are each equal arc lengths and the means for measuring position are positioned equally spaced around the circumference of the structural arcs to optimize the potential range of travel for each structural arc with respect to the means for measuring position.

However, with particular reference to FIG. 7, the co-planar relationship of the structural arcs 700-702 facilitated by their split-ring design, as well as that of the optical encoder sensors 705-707, still achieves the slimmer profile relative to conventional designs while contravening the conventional wisdom underlying their design.

Various terms have been defined above. To the extent a term used in a claim is not defined above, it should be given the broadest definition persons in the pertinent art have given that term as reflected in at least one printed publication or issued patent. While the foregoing is directed to embodiments of the present disclosure, other and further embodiments of the disclosure may be devised without departing from the basic scope thereof, and the scope thereof is determined by the claims that follow.

What is claimed is:

1. A relative deflection detector capable of sensing a relative deflection in a first component, said relative deflection detector comprising:
   at least two structural arcs each having a sequence of indicators wherein each structural arc is operably connected to said first component at a predetermined location; and
   at least two means for measuring positions each positioned in a proximate relationship with a predetermined one of said at least two structural arcs, wherein each of said at least two means for measuring positions is capable of detecting a position of at least one of said at least two structural arcs by reading at least one of said sequence of indicators,
   wherein said position detected by each of said at least two means for measuring positions may be used to calculate at least one relative deflection of said first component,
   wherein said at least two structural arcs correspond to a first predetermined number of structural arcs, and
   wherein said at least two means for measuring positions correspond to a second predetermined number of means for measuring positions equal to said first predetermined number plus one.

2. The detector in claim 1,
   wherein said first position and said second position are comprised of a first angular position or first angle of rotation and a second angular position or second angle of rotation, respectively.

3. A relative deflection detector capable of sensing a relative deflection in a first component, said relative deflection detector comprising:
   at least two structural arcs each having a sequence of indicators wherein each structural arc is operably connected to said first component at a predetermined location and wherein said at least two structural arc are comprised of:
      a first structural arc having a first sequence of indicators wherein said first structural arc is attached to said first component at a first predetermined location; and
      a second structural arc having a second sequence of indicators wherein said second structural arc is attached to said first component at a second predetermined location,
      wherein said first and second structural arcs are positioned in concentric and coplanar relationship with each other; and
   at least two means for measuring positions each positioned in a proximate relationship with a predetermined one of said at least two structural arcs wherein each of said at least two means for measuring positions is capable of detecting a position of at least one of said at least two structural arcs by reading at least one of said sequence of indicators, wherein said at least two means for measuring positions are comprised of:
      a first means for measuring position positioned in a first proximate relationship with said first or second structural arc wherein said first means for measuring position is capable of detecting a first position of said first structural arc by reading said first sequence of indicators; and
      a second means for measuring position positioned in a second proximate relationship with said first or second structural arc wherein said second means for measuring position is capable of detecting a second position of said second structural arc by reading said second sequence of indicators,
   wherein said first position, second position, or both may be used to calculate said at least one relative deflection of said first component.

4. The detector in claim 3,
   wherein said at least two structural arcs are further comprised of:
   a third structural arc having a third sequence of indicators wherein said third structural arc is attached to said first component at a third predetermined location,
   wherein said first, second, and third structural arcs are positioned in concentric and coplanar relationship with each other, and
   wherein said at least two means for measuring positions are further comprised of:
   a third means for measuring position positioned in a third proximate relationship with said first, second, or third structural arc wherein said third means for measuring position is capable of detecting a third position of said third structural arc by reading said third sequence of indicators,
   wherein said first position, second position, third position, or any combination may be used to calculate said at least one relative deflection of said first component.

5. The detector in claim 3, wherein said at least two structural arcs are further comprised of:
   a third means for measuring position positioned in a third proximate relationship with said first structural arc or said second structural arc, wherein said third means for measuring position is capable of detecting said first position of said first structural arc by reading said first sequence of indicators; or detecting said second position of said second structural arc by reading said second sequence of indicators; or both said first and second positions by reading said first and second sequences of indicators.

6. The detector in claim 5, wherein said first, second, and third means for measuring positions are each capable of detecting said first and second positions by reading said first and second sequences of indicators.

7. The detector in claim 5, wherein said first and second sequences of indicators are unique and different with respect to each other and may be used to discriminate between said first and second structural arcs.

8. The detector in claim 3,
   wherein said first means for measuring position is positioned in a coplanar relationship with said first and second structural arcs, and
   wherein said second means for measuring position is positioned in a coplanar relationship with said first and second structural arcs.

9. The detector in claim 3, wherein said first and second means for measuring positions are each capable of detecting said first position, said second position, or both.

10. The detector in claim 3,
    wherein said first and second means for measuring positions are optical encoder sensors, wherein said first sequence of indicators is comprised of a first sequence of codes inscribed on a first outer circumference of said first structural arc, and wherein said second sequence of indicators is comprised of a second sequence of codes inscribed on a second outer circumference of said second structural arc.

11. A relative deflection detector capable of sensing a relative deflection within a deflector in response to an applied force, said relative deflection detector comprising:

a split ring that, in operation, indicates a relative deflection of said deflector, said split ring comprising:

a first structural arc attached to said deflector at a first predetermined location and comprised of a first plurality of indicators capable of indicating a first position of said first structural arc;

a second structural arc positioned relative to said first structural arc in concentric and coplanar relationship thereto, attached to said deflector at a second predetermined location, and comprised of a second plurality of indicators capable of indicating a second position of said second structural arc, and a reader that, in operation, reads said first and second plurality of indicators, said reader comprising:

a first means for measuring position positioned in coplanar relationship with said first and second structural arcs; and a second means for measuring position positioned in coplanar relationship with said first and second structural arcs, wherein said first and second means for measuring positions are capable of detecting said first position of said first structural arc by reading said first plurality of indicators, wherein said first and second means for measuring positions are also capable of detecting said second position of said second structural arc by reading said second plurality of indicators, and wherein said first and second positions may be used to calculate a relative deflection of said deflector.

12. The detector in claim 11, further comprising:

a third structural arc comprised of a third plurality of indicators capable of indicating a third position of said third structural arc wherein said third structural arc is attached to said deflector at a third predetermined location; and a third means for measuring position positioned in coplanar relationship with said first, second, and third structural arcs, wherein said first and second means for measuring positions are capable of detecting said third position of said third structural arc by reading said third plurality of indicators, wherein said third means for measuring position is capable of detecting said first, second, and third position of said first, second, and third structural arc by reading said first, second, and third plurality of indicators, respectively, and wherein said first, second, and third positions may be used to calculate a relative deflection of said deflector.

13. The detector in claim 11, further comprising a third means fir measuring position positioned in coplanar relationship with said first structural arc and said second structural arc, wherein said third means for measuring position is capable of detecting said first position of said first structural arc by reading said first plurality of indicators; or detecting said second position of said second structural arc by reading said second plurality of indicators; or both said first and second positions by reading said first and second plurality of indicators.

14. The detector in claim 11, further comprising software capable of processing said first and second positions to calculate a first angle of rotation and a second angle of rotation and thereafter calculate said relative deflection of said defector.

15. The detector in claim 14, wherein said first and second structural arcs form a first gap and a second gap, wherein said first and second gaps define said first and second angles of rotation, respectively, wherein said first and second angles of rotation may change as said deflector reacts to said applied force, wherein said software processes said first and second positions and calculates said first and second angles of rotation and is capable of calculating said change in said first and second angles of rotation, and wherein said software calculates said relative deflection of said deflection based on said change in said first and second angles of rotation.

16. A series elastic actuator assembly operably connected to a load, comprising:

a motor;

a drive powered by said motor;

a first component operably connected to either said drive or said motor wherein said first component is capable of relative deflection within itself;

an interface operably connected between said first component and said load or between said drive and said load; and a relative deflection detector in proximate relation to said first component whereby said relative deflection detector is capable of determining said relative deflection of said first component, said relative deflection detector comprising:

a first structural arc having a first sequence of codes inscribed on a first outer circumference of said first structural arc wherein said first structural arc is attached to said first component at a first predetermined location;

a second structural arc having a second sequence of codes inscribed on a second outer circumference of said second structural arc wherein said second structural arc is attached to said first component at a second predetermined location, and wherein said first and second structural arcs are positioned in concentric and coplanar relationship with each other;

a first optical encoder sensor positioned in coplanar relationship with said first structural arc; and a second optical encoder sensor positioned in coplanar relationship with said second structural arc, wherein said first and second optical encoder sensors are each capable of detecting a first position of said first structural arc by reading said first sequence of codes and a second position of said second structural arc by reading said second sequence of codes, and wherein said first and second positions may be used to calculate a relative deflection of said first component.

17. The series elastic actuator assembly in claim 16, further comprising:

a third structural arc having a third sequence of codes inscribed on a third outer circumference of said third structural arc wherein said third structural arc is attached to said first component at a third predetermined location; and a third optical encoder sensor positioned in proximate and coplanar relationship with said third structural arc wherein said third optical encoder sensor is capable of detecting a third position of said third structural arc by reading said third sequence of codes;

wherein said first, second, and third positions may be used to calculate a relative deflection of said first component.

18. The series elastic actuator assembly in claim 16, further comprising a third optical encoder sensor positioned in proximate and coplanar relationship with said first structural arc and said second structural arc, wherein said third optical encoder sensor is capable of detecting said first position of said first structural arc by reading said first sequence of codes; or detecting said second position of said second structural arc by reading said second sequence of codes; or both said first and second positions by reading said first and second sequences of codes.

* * * * *